United States Patent [19]

Gerber et al.

[11] 4,078,916
[45] Mar. 14, 1978

[54] RECOVERY OF SILVER AND OTHER VALUABLE CONSTITUENTS FROM POLYESTER BASED PHOTOGRAPHIC FILM

[75] Inventors: Arthur H. Gerber, University Heights; Eugene Wainer, Shaker Heights, both of Ohio

[73] Assignee: Horizons Research Incorporated, Cleveland, Ohio

[21] Appl. No.: 784,829

[22] Filed: Apr. 5, 1977

Related U.S. Application Data

[63] Continuation-in-part of Ser. No. 586,014, Jun. 11, 1975, abandoned.

[51] Int. Cl.$^2$ .................. C22B 11/00; C08J 11/04
[52] U.S. Cl. .................. 75/83; 75/118 P; 260/2.3; 134/13
[58] Field of Search .......... 423/27; 75/83, 118 P; 260/2.3, 75 T; 134/10, 12, 13, 42; 96/50 R, 119 R

[56] References Cited

U.S. PATENT DOCUMENTS

| | | | |
|---|---|---|---|
| 3,696,058 | 10/1972 | Teti | 260/2.3 |
| 3,701,741 | 10/1972 | Meyer et al. | 260/2.3 |
| 3,836,486 | 9/1974 | Hafner | 528/492 |
| 3,873,314 | 3/1975 | Woo et al. | 75/118 P X |
| 3,912,664 | 10/1975 | Wainer | 528/492 |
| 3,929,466 | 12/1975 | Moynahan et al. | 75/118 P X |
| 3,935,169 | 1/1976 | Reen | 260/75 T |
| 4,009,048 | 2/1977 | Jensen | 134/13 |

OTHER PUBLICATIONS

Kovshak et al., *Polyesters,* Pargamon Press, N. Y. (1965), pp. 298, 299.
Morton, *Laboratory Technique in Organic Chemistry,* McGraw-Hill Inc., NY (1938), pp. 147-153.
Roberts et al., *An Introduction to Modern Experimental Organic Chemistry,* Holt, Rhinehart & Winston, Inc., NY (1969), pp. 35-43.

*Primary Examiner*—O. R. Vertiz
*Assistant Examiner*—Brian E. Hearn
*Attorney, Agent, or Firm*—Lawrence I. Field

[57] ABSTRACT

Scrap photographic film comprising at least a four component system involving a polyalkyleneterephthalate film base, an adhesive or subbing layer utilizing a terpolymer consisting chiefly of polyvinylidenechloride and a gelatin layer containing metallic silver or a compound thereof and a variety of contaminants such as causal dirt, dyes and the like is broken down for recovery of the valuable constituents therein including the silver, the polyvinylidenechloride terpolymer, and the polyesters by treating the chopped photographic film at an elevated temperature with a solvent for both the polyester and polyvinylidenechloride values in which solvent both the gelatin and silver values are insoluble, under conditions chosen to insure the quantitative recovery of the silver values.

17 Claims, No Drawings

RECOVERY OF SILVER AND OTHER VALUABLE CONSTITUENTS FROM POLYESTER BASED PHOTOGRAPHIC FILM

This application is a continuation-in-part of United States Patent Application Ser. No. 586,014 filed June 11, 1975, now abandoned.

BACKGROUND OF THE INVENTION - THE RAW MATERIALS

While the usual polyester used as a photographic film base is generally polyethyleneterephthalate, other synthetic linear polymers in the polyester class have also been used at one time or another for the same purpose and may find their way into discarded forms which may be designated as scrap.

Synthetic linear polyesters are well known in the art and the present invention is applicable to the general class of synthetic linear thermoplastic polyesters. A polyester is defined as a synthetic linear condensation type polymer whose repeating units contain the ester group,

these groups being integral members of the linear polyester chain. Polyesters may be those derived from aliphatic dibasic acids such as oxalic, succinic, glutaric, adipic, and sebacic acids and glycols such as ethylene glycol, propylene glycol, trimethylene glycol, hexamethylene glycol and decamethylene glycol. Polyesters may also be derived from aromatic dicarboxylic acids such as terephthalic acid and isophthalic acid and glycols such as ethylene glycol. Polyesters may also be derived from hydroxy acids and their corresponding lactones such as those from hydroxypivalic acid, α-hydroxyisobutyric acid, ω-hydroxycaproic acid, ω-hydroxydecanoic acid, γ-butyrolactone and 4-hydroxyhexanoic acid lactone.

An important source of silver-bearing polyester material is scrap photographic film. When the photographic film is based on silver halide, this scrap contains a polyester base, silver halide and/or metallic silver, gelatin, and a subbing layer on the polyester surface consisting principally of polyvinylidenechloride and usually comprising a terpolymer containing a major amount of vinylidenechloride, a lesser amount of acrylonitrile, and a relatively small amount of a polymerizable acid taken from the class of itaconic, acrylic or methacrylic acids of the alkyl esters thereof. The scrap may also contain casual dirt and various dyes or pigments and may also be contaminated with cellulose acetate film.

Substantially all of the prior art dealing with solvent treatment of scrap materials such as photographic film having a linear thermoplastic polyester as a film base, have as their principal object of the recovery of the polyester values only in useful form. The prior art which deals with recovery of silver values from scrap photographic film invariably utilizes techniques which remove the silver values preferentially, leaving the polyester containing values in effectively unchanged condition, or in other words, in the same shape and form as originally supplied to the recovery process. Thus, for example, the techniques are normally deliberately chosen so that the polyester values and in many cases the polyvinylidenechloride values remain insoluble in the solution treatment. This preferential removal of silver is also utilized in the prior art even when the polyester is placed in solution for recovery purposes.

Known procedures as described in U.S. Pat. Nos. 3,647,422 issued Mar. 7, 1972; 3,873,314 issued Mar. 25, 1975 and 3,928,253 issued Dec. 23, 1975 for example, include destruction of the gelatin layer for removal of the silver value in a filterable condition so that it can be recovered as a precipitate by (1) treatment of the film with a proteolytic enzyme which dissolves the gelatin thus freeing the silver; or (2) swelling and dissolving the gelatin layer and releasing the silver with the use of hot caustic solutions; or (3) treatment of the scrap film with hot ethylene glycol, ethanolamine and the like.

In some cases, the polyester chips thus recovered are sometimes obtained in a useful condition for reuse but usually sufficient contamination still remains so that the degree of reuse is severely limited. For example, the polyester film base may contain pigments and dyes. Further, some of the treatments leave a significant portion of the polyvinylidenechloride terpolymer remaining on the surface of the polyester which is a strongly degrading influence when the recovered polyester is to be utilized as a thermoplastic raw material for the preparation of full value polyester articles.

In other cases, the scrap photographic film may contain significant amounts of cellulose triacetate which the treatments described heretofore in the prior art for silver recovery do not remove. Again, the presence of this cellulose triacetate is an extremely deleterious contaminant which prevents adequate utilization of the recovered polyester.

In brief, the present novel process for recovery of values from scrap photographic film is based on treatment of the silver containing film with specific solvents under controlled conditions in which the solvents act as solvents for all the non-water soluble polymers and in which the gelatin and silver fractions are insoluble, and from which the non-water soluble polymers can be separated and recovered as individual polymers.

In order for the described solution process to be fully effective for the purposes of this invention not only must all silver values be recovered quantitatively but also the polymeric materials other than gelatin require recovery in fully useful form through the medium of economic and quantitative procedures. The most useful form in which the non-water soluble polymer can be recovered is as a powder of controlled particle size with particular reference to the polyester.

Equally important is the requirement for solvent stability. Economic and chemical considerations require that there be little or no decomposition of the solvent media or significant reaction of the solvent media with the photographic film raw material, since it is an economic necessity that the solvent be capable of being recovered in fully useful form for recycling through the process effectively indefinitely. Decomposition or undesired modification of the solvent, even if of small extent, reduces this required recycle capability, increases the cost of solvent recovery, reduces the amount of solvent which can be recovered for useful purposes, and is some cases decomposition is sufficiently extensive so as to limit severely or even prevent the reuse of the solvent for recycle purposes. Thus, many solvents which are adequate from the standpoint of placing the non-water soluble polymers in solution initially to permit the desired partition of the various components of the photographic film, are undesirable for the purposes of this invention because of the extensive decomposition which such solvents undergo in the preferred process conditions.

Further in addition to solvent stability, the mutual solvents used for dissolving the non-water soluble components of the photographic film scrap should exhibit a solubility for the polyester portions of the film scrap preferably not exceeding 3 grams of polyester per 100 cc's of solvent, when the temperature of the system is in the range of 25° to 35° C and again preferably should exhibit substantially zero but not more than 0.5% solubility for the polyester portions of the film scrap when the mixture of mutual solvent, residual polyester and other non-water soluble polymers is cooled to a temperature range between 0° to −10° C. It is a further requirement that the mutual solvent utilized exhibit a solubility of at least 10 grams per 100 cc's of mutual solvent for the polyvinylidenechloride portion, and other non-water soluble polymer over a temperature range between −10° C and +35° C, and that the solubility of these components be considerably higher at temperatures above 35° C.

Further, in order for a solvent procedure for the preparation of polyester powder by precipitation from solution to be effective economically and quantitatively, there should be no degradation in molecular weight of the raw material fed to the dissolving medium or, in other words, the intrinsic or relative viscosity of the final product obtained in powdered form should not be less than the similar parameter of the starting raw material. In addition, the recovery of this non-degraded polyester needs to be reasonably quantitative.

Thus, in order to meet all of the requirements heretofore indicated with regard to stability of solvent, solubility of polyester and polyvinylidenechloride and other non-water soluble polymers, maintenance of molecular weight of the recovered polyester in pure form and other requirements, the varieties and members of mutual solvents which meet all of these requirements without exception become highly restricted particularly when one recognizes that a common contaminant of scrap silver bearing photographic film may be cellulose acetate.

Thus, solvents which have been designated in the prior art as being primarily suitable for placing polyester in solution even under preferred conditions suffer substantially from one or more defects which place them outside of the preferred requirements. In some cases, the polyester is precipitated by quenching in various liquids, many of which are in themselves solvents for polyester at room temperature above the 3% limit recited above. Examples of such solvents are those involving mixtures of halogenated aliphatic acids either alone or combined with chlorinated hydrocarbons, phenols such as chlorinated phenol, phenol itself and metacresol, again either alone or in combination with chlorinated hydrocarbons. In addition if these types of solvents are utilized under the conditions described in this invention profound degradation of the molecular weight of the polyester component takes place. Hydrocarbons such as diphenylmethane, biphenyl, acenaphthene, phenanthrene and naphthalene which are designated in the prior art as solvents for polyester are also unsuitable since the cellulose acetate contamination is insoluble in such solvents under the preferred conditions defined by this invention.

Many other solvents are defective not only for the foregoing reasons but also because they are powerful degraders of the molecular weight of polyester when utilized under the preferred conditions typified by the process of this invention. Such solvents which in addition to other defects cause molecular weight degradation include the halogenated aliphatic acids, the phenols, the cresols, benzyl alcohol, ethylene glycol, hexafluoroisopropanol, and others.

Certain other solvents listed in the prior art as appropriate solvents for polyester undergo significant decomposition when utilized in accordance with the process of this invention, including dimethylsulfoxide, quinolines, organic sulfides, substituted amines and other heterocyclic nitrogen compounds. However, amides are satisfactory. Further, the adverse decomposition appears to be typical of halogenated solvents generally. The evidence indicates that the degradation reaction is initiated by the silver or gelatin component or both. Even when the degradation of solvent is slight for whatever reason and outside of the difficulties imposed on adequate solvent recovery, a principal result is the recovery of a disclosed polyester end product which should be glistening white with no off-white rendition in order to ensure full utility.

Finally, since more than one non-water soluble polymer is placed into complete solution under the preferred conditions of the process of this invention, it is a requirement that means for separating the individual components be available so that each of these non-water soluble polymeric materials may be separated from the other and recovered in pure powdered form.

As a consequence of this wide group of restrictions on the nature, performance and character of the mutual solvent for all of the non-water soluble polymeric constituents, materials which meet these requirements become severely limited and the attaining of the desired results is not only a question of choice of the appropriate solvent or mixture of solvents but the manner in which these solvents are processed.

The availability of undegraded polyester powder of controlled particle size represents a distinct advantage over recovered polyester which retains its original shape even though the recovered polyester in its original shape may be designated as pure. While both powdered polyester and polyester in chip form may be utilized for forming shaped articles from the melt, the powder form possesses a number of advantages over chips. Powder is more readily compounded prior to the melting operation. The molecular weight of polyesters can be upgraded by heat treatment in a vacuum and/or in an inert atmosphere at temperatures below the melting point for extended periods of time, and the finer the particle size of the polyester utilized in this molecular upgrading process, the faster this molecular weight upgrading can be achieved; and, finally, the powdered form is a necessity for the production of a compounded surface finish. The production of powder of the desired particle size from bulky forms by mechanical attrition procedures is extremely difficult, costly and sometimes impossible in view of the toughness of the starting raw material.

OBJECT AND DESCRIPTION OF INVENTION

It is the principal object of this invention to define a process whereby the silver values available in photographic film scrap can be recovered quantitatively while at the same time enabling the recovery of the polymeric values other than gelatin in high yields in pure powdered form free of contamination and of molecular weight (i.e. relative viscosity) with regard to the polyester values at least equivalent to the molecular weight of the polyester in the starting raw material.

It is a further object of this invention to define a process whereby polyethyleneterephthalate (PET) and/or polytetramethyleneterephthalate (PTMT) can be produced in high yields in powder form from photographic film sources of raw materials containing PET and/or PTMT.

It is another object of this invention to produce the desired powder in a particle size range in which the majority of the particles are below 10 microns in size and/or in another form in which the majority of the desired particles are above 10 microns in size.

It is a further object of this invention to provide means for indefinite recycling of the reagents utilized in the process which are needed for the production of the desired end product.

It is a further object of this invention not only to accomplish the objects heretofore recited with regard to a pure product of controlled particle size but also to define means for recovering contaminants which may be present in these types of polyethyleneterephthalate scrap whether such contaminants have economic value or not. In the case that these contaminants do have economic value, then the final object of the invention is to recover these contaminants in such a form that their economic value can be realized.

TABLE 1

SINGLE SOLVENTS FOR POLYESTER CONTAINING PHOTOGRAPHIC FILM

1. AROMATIC ETHERS
Anisole
Phenetole
Benzylether
Diphenyloxide (phenyl ether)

2. AROMATIC KETONES
Acetophenone
2-methylbenzophenone
3-methylbenzophenone
4-methylacetophenone 3. ESTERS OF DICARBOXYLIC AROMATIC ACIDS
Dibutyl phthalate
Bis(2-ethylhexyl)phthalate 4. LACTAMS
2-pyrollidone
N-butylpyrollidone 5. LACTONES
Gamma butylacetone 6. PYROLLES
1-benzyl pyrolle
1-butyl pyrolle
2,5-dimethyl pyrolle

*7. AMIDES
Dimethylformamide
N-methylformamide
N,N-diethylacetamide
1,1,2,2-tetramethylurea

*Least preferred of the group.

TABLE 2

MIXTURES OF SOLVENTS FOR POLYESTER CONTAINING PHOTOGRAPHIC FILM 1. (Ethers plus Ketones)
 50 Pts. of diphenyloxide plus 50 pts of acetophenone 2. (Ketones plus Lactams)
 50 Pts. of acetophenone plus 50 pts of 1-methyl-2-pyrollidone 3. (Esters plus Ketones)
 60 Pts. of dibutylphthalate plus 40 pts. of acetophenone 4. (Esters plus Lactams)
 70 Pts. of dibutylphthalate plus 30 pts of 1-methyl-2-pyrollidone 5. (Ethers plus Pyrolles)
 50 Pts. of diphenyloxide plus 50 pts. of 2,5-dimethyl-pyrolle without decomposition and should remain a liquid at temperatures not greater than 35° C. The chosen solvents should have the capability for producing a solution of the polyester at a temperature at or below the boiling point of the solvent or solvent mixture at atmospheric pressure to yield a concentration of at least 10 percent by weight and preferably greater than 20 percent by weight and exhibit a viscosity under such conditions which permits easy filtration of the solution. Secondly, the solvent must be of such a nature that the polyester starts to precipitate as a powder at some temperature considerably below the temperature at which the polyester is placed in solution but, in addition, at a temperature which is substantially above room temperature. At this temperature of precipitation, the powder will normally yield a product having a particle size less than 10 microns if the precipitating fluid is chilled rapidly to room temperature with stirring during the precipitation process. If maintained for a period of at least 20 to 40 minutes at or slightly below the temperature of precipitation before chilling to room temperature, then the normal particle size of the end polyester product is invariably in excess of 10 microns and sometimes as high as 100 microns. The product obtained in this latter fashion will generally exhibit a range of particle sizes, therefore, between 10 and 100 microns. The non-water soluble contaminating polymers such as polyvinylidene terpolymer, cellulose acetate and the like should exhibit a solubility of at least 10 percent (10g per 100 cc's of solvent) at room temperature (ca 20° to 25° C) and higher degrees of solubility are invariably encountered.

Some of the polyester remains in the solution at room temperature after the powdered product is recovered by filtration. The maximum solubility for any of the types of solvents indicated in Table 1, at room temperature (ca 20° to 25° C) will not exceed 3% by weight of these types of solvents.

Under the conditions of the process of this invention the dissolving of the non-water soluble polymeric constituents, including the polyester constituent, is usually complete in about 15 minutes or less and in less than 5 minutes with the use of preferred mixtures of solvents.

This high speed and efficiency of solution is invariably encountered with the chosen solvents, when the temperature of solvent treatment is at least 200° C. If the scrap film composite has been preheated to at least 150° C for 10 to 20 minutes prior to insertion in the hot solvent the time period for solution in the hot solvent may be reduced by about one-third of the normal time. This high-speed of solution encountered by using preheated scrap feed may be due to the reduction in loss of temperature which would take place when substantial amounts of cold feed are added to the hot solvent thereby reducing the temperature of the solvent below desired levels or removal of water, known to be a retarder of speed of solution, or both.

DESCRIPTION OF PROCESS

The basic raw material utilized for the purposes of this invention is scrap photographic raw material, generally on a polyester base and in the form of the four component system as described in previous portions of this specification. Such raw material may be contaminated with silver bearing film placed on a cellulose acetate base, casual dirt and sometimes paper. The silver present in the silver containing portions of the film may be all metallic silver or, more generally, a combination of metallic silver and silver halide. In the process of treatment to be described hereinafter, it is necessary that the chosen solvents utilized and described in Tables 1 and 2, be maintained at a temperature such that the non-water soluble polymeric portions exclusive of paper and cellulose materials such as cotton be placed in solution in a time period not exceeding 15 minutes. Speed of solution, as indicated before, is facilitated if the scrap raw material is preheated sufficiently to drive out any water that may be present, particularly in the gelatin portions of the film. Usually a heat treatment of the film at a temperature of the order of 150° C for a period of about 10 to 15 minutes is sufficient to eliminate the majority of the water. Again, as indicated previously, this step is necessary not only to prevent a significant drop in the desired temperature of the solvent but also to improve the speed of dissolution of the polyester portions of the scrap film in the chosen solvent and the chosen temperature. If the preheating is omitted, the water is removed by boiling out of the solution. Whether solvent contamination takes place or not this water removal step plus its attendant cooling of the solvent increases the time required for the solution of the polyester portions of the film well beyond the 15 minute limit recited previously.

As soon as solution is complete, notable darkening of the solution starts to take place, probably due to the formation of pyrolytic products of the gelatin component. We have found that once solution is complete that not only does an agglomeration of the pyrolysis products of the gelatin take place but it also acts as a gathering agent for the silver to facilitate separation of the silver and the gelatin by filtration. Also, the pyrolytic products of the gelatin appear to act as reducing agents for silver compounds so that the form in which the silver is removed from the reaction mixture as a precipitate along with the pyrolytic gelatin appears to be present substantially in the form of metallic silver.

In order to ensure that the desirable gelatin agglomeration, gathering action of the products of pyrolysis of the gelatin for the silver and the quantitative precipitation of silver to take place, after solution is complete and the darkening of the solution is noted, the reaction mixture is maintained at the solution temperature for at least 10 minutes and up to as long as 20 minutes to complete the precipitation and gathering action. The completion of this reaction is easily noted since the properly formed precipitate settles rapidly to the bottom of the container even under conditions of moderate stirring.

The silver, dirt, gelatin products, cellulosic fibers and the like are then removed by filtration of the hot reaction mixture and the precipitate washed with the hot solvent.

Thereafter, two different processes may be employed principally for the purposes of modifying the particle size of the recovered polyester. In the first, the filtrate is cooled to the temperature at which the polyester first starts to precipitate out of the solution and is then maintained at this first precipitation temperature for a period of 20 to 40 minutes. This yields eventually a rather coarse particle size polyester product exhibiting a size range between 10 and 100 microns.

In the second, once the silver bearing materials are removed by filtration, the filtrate is cooled rapidly to a temperature in the range of zero to −10° C. This produces a precipitated polyester having a particle size less than 10 microns.

In the first, where the coarse size polyester is produced, partitioning solvent treatments are utilized after the first crop of polyester product is removed by filtration and washing. These partitioning techniques include treatment with solvents taken from the class of the higher alkyl ketones such as methylbutylketone or methylisoamylketone in which solvent the polyester is insoluble and the combination of the solvent remaining with the polyester, the polyvinylidenechloride component and the cellulose acetate component present are soluble. The small amount of precipitated polyester is again removed by filtration.

The mixture of the polyvinylidenechloride and the cellulose acetate can again be partitioned by precipitating the polyvinylidene product with mixtures of alcohols and hydrocarbons in which solvent the cellulose acetate is soluble. Finally, the cellulose acetate is precipitated out of its solution by flushing with water.

The solvents are recovered for reuse by flushing distillation techniques which may or may not involve azeotropic distillation techniques well known in the art.

The various precipitates are obtained in dry powdered form by vacuum drying. In the case of the polyester, the powdered product vacuum dried at room temperature has the same relative viscosity as the relative viscosity of the starting raw material. If, however, vacuum drying of the polyester is carried out at temperatures of the order of 200° C for periods of time not exceeding 1 hour, the relative viscosity of the powder produced without attendant agglomeration of the product is radically increased. As an example, if one starts out with a polyester raw material exhibiting a relative viscosity of 1.52, a viscosity of 2.1 is achieved by vacuum drying in a pressure range of 1 to 10 torr at 200° C for a period of 1 hour.

In order to obtain samples for determination of relative viscosity of the original scrap raw material, the usual practice is to remove the gelatin and the silver layers by digestion with a proteolytic enzyme followed by washing in water. The polyvinylidene terpolymer remaining on the polyester base is then removed by treatment of the flake material for about 15 minutes at room temperature with dimethylformamide, washing with dimethylformamide, followed by washing in alcohol and drying.

A second procedure is to strip the film with ethylene glycol by procedures well known in the art. While this might involve some loss of the polyester component it is known that this stripping procedure does not reduce the relative viscosity. The advantage of the use of the ethylene glycol is that the gelatin layers, silver and the polyvinylidenechloride terpolymer are removed simultaneously. Essentially quantitative recovery of the various values are achieved.

The various steps summarized above are depicted more clearly in the following section.

THE PROCESS OUTLINE

A. FIRST PROCESS [TO PRODUCE COARSE PARTICLE POLYESTER (10 TO 100 MICRONS)]

1. Dissolve silver bearing scrap at temperature and time listed in Table 3.
2. Maintain at dissolving temperature for 10 to 20 minutes after polymer solution is completed in order to ensure complete precipitation of silver.
3. Separate silver, gelatin residue and dirt by filtration and washing with hot solvents of Table 3.
4. Cool filtrate plus washings to temperature of first precipitation of polyester.
5. Maintain solution plus polyester precipitate at preheating temperature for 20 to 40 minutes to produce polyester precipitate having an eventually recovered particle size of 10 to 100 microns.
6. Cool to a temperature range of 25 to 35° C.
7. Add higher aliphatic ketone (methylbutylketone or methylisoamylketone) with stirring.
8. Filter and wash with ketones to yield pure polyester powder.
9. Vacuum dry polyester powder to yield final polyester product.
10. Flush filtrate from Step 8 with 60% methyl alcohol plus 40% hexane to precipitate polyvinylidene. product and filter.
11. Wash precipitate with flushing solvent of Step 10.
12. Vacuum dry precipitate from Step 11 to recover polyvinylidene containing powder.
13. Precipitate cellulose acetate from filtrate obtained in Step 11 by flushing with water.
14. Filter, wash precipitated cellulose acetate with solution containing 50% methyl alcohol and 50% water.
15. Vacuum dry washed cellulose acetate precipitate.
16. Collect all solvents and recover each by fractional and azeotropic distillation.

B. ALTERNATE PROCESS [TO PRODUCE FINE PARTICLE SIZE POLYESTER (10 MICRONS)]

1. Same as A-1.
2. Same as A-2.
3. Same as A-3.
4. Cool filtrate from Step 3 rapidly to 0 to −10° C.
5. Filter and wash with cold solvent used in Step 1.
6. Vacuum dry polyester precipitate obtained from Step 5 to produce pure polyester final product.
7. Allow filtrate to warm to about 25° C.
8. Same as Step A-7, filter off small amount of precipitate, wash with solvents of Step A-7, add precipitate to Step 6.
9. Treat filtrates from Steps 7 and 8 in same manner as described in Process A, Steps 10 through 16.

TABLE 3
EXAMPLES OF PHYSICAL CONDITIONS FOR REPRESENTATIVE SOLVENTS TAKEN FROM TABLE 1 (MAXIMUM SOLUTION TIME = 15 MINUTES)

| EX. NO. | SOLVENT | B.P. | SOLVENT TEMP. | APPROXIMATE PRECIPITATION TEMP. |
|---|---|---|---|---|
| 1. | Phenyl Ether | 258° C | 225° C | 100° C |
| 2. | Acetophenone | 202° C | 190° C | 85° C |
| 3. | Dibutylphthalate | 340° C | 275° C | 150° C |
| 4. | 1-methyl-2-pyrollidone | 202° C | 175° C | 65° C |
| 5. | 1-benzyl pyrolle | 247° C | 200° C | 85° C |
| 6. | 1,1,2,2,-tetramethyl urea | 175° C | 165° C | 85° C |

TABLE 4
EXAMPLES OF PHYSICAL CONDITIONS FOR REPRESENTATIVE SOLVENTS TAKEN FROM TABLE 2 (MAXIMUM 24 SOLUTION TIME = 5 MINUTES)

| EXAMPLE NUMBER | SOLVENT NUMBER | SOLVENT TEMP. | APPROXIMATE PRECIPITATION TEMPERATURE |
|---|---|---|---|
| 7. | 1 | 180° C | 85° C |
| 8. | 2 | 170° C | 65° C |
| 9. | 3 | 200° C | 125° C |
| 10. | 4 | 200° C | 125° C |
| 11. | 5 | 190° C | 90° C |

EXAMPLES 1 THROUGH 6

Unexposed x-ray film was utilized as the raw material. This film exhibited a proximate analysis of 26.9 percent silver halide (partially reduced to metallic silver in view of blanket exposure to light during handling) 11 percent gelatin, 3.5 percent of the previously described terpolymer based on polyvinylidenechloride and 59.6 percent polyethyleneterphthalate. The stripped film yielding clean polyester exhibited a relative viscosity of 1.52. The original film was chopped to produce pieces 0.25 to 0.50 inches in diameter.

400 grams of the chopped film were heat treated at 150° C in moving air for 15 minutes and then inserted with stirring in separate runs in 1000 grams of the solvents (separately) listed in Table 3, the solvents being at the solvent temperature listed. Time of stirred first digestion is 10 to 15 minutes (not more than 15 minutes). The completion of the digestion is established by a color change from tan to deep brown-black. Digestion is continued at the reaction temperature for at least 10 minutes. Completion of the digestion is denoted by rapid settling of a coarse black precipitate.

The solution was filtered at the reaction temperature and the precipitate washed with 200 grams of the individual Table 3 solvents, the washing solvent being maintained at the solvent temperature listed in Table 3.

The washed precipitate was calcined in air at 800° C for 1 hour, leaving 63 grams of residue, analyzing 98.4 percent silver, the balance being primarily a combination of carbonaceous material, siliceous antimony material, and traces of other metals indicating that the recovery of silver was close to 100 percent.

The hot filtrate was cooled to the respective temperature marked "Precipitation Temperature" in Table 3, at which temperature precipitation of the polyester is initiated. The reaction mixture is maintained at the precipitation temperature for 30 minutes, after which the mixture is cooled to about 20° C.

300 grams of methylbutylketone are then added with stirring and the precipitated polyester is removed by filtration and washing with another 300 gram portion of methylbutylketone. The washed precipitate is vacuum dried at 200° C for 1 hour. 237 grams of glistening white polyester powder was obtained, equivalent to a yield in excess of 99 percent, exhibiting a relative viscosity of 2.10. The principal particle size range of the powder was between 10 and 100 microns with less than 10 percent of the product exhibiting a particle size range of less than 10 microns.

All of the liquids obtained by filtration plus the liquids collected in the vacuum traps from the vacuum distillation step were collected together to yield a total of approximately 1200 grams of solution.

Approximately half the solution was removed by distillation at 100° C at 300mm of mercury and the distillate obtained was chiefly methylisobutylketone.

600 cc's of a 50:50 mixture of methyl alcohol and water were provided and the pot liquor obtained from the distillation step at room temperature was added thereto dropwise with stirring. The finely divided precipitate obtained was filtered off, washed with methyl alcohol and vacuum dried at 20° C. A yield of 15.4 grams of product was obtained, this being equivalent to a yield of 110 percent of the polyvinylidene terpolymer, indicating a probably contamination with residual polyester of about 10 percent.

EXAMPLE 7

Same as Example 1, except that the polyester product obtained was vacuum dried at 25° C for 48 hours. While the yields obtained in Example 1 and Example 7 were identical, the relative viscosity of the polyester product was 1.54, slightly above the starting relative viscosity of 1.52, indicating that no molecular weight degradation of the polyester had taken place as a consequence of the solvent separation process.

EXAMPLES 8 THROUGH 12

Same as Example 1, except that the respective solvent mixtures listed in Table 2 were used under the conditions defined in Table 4 in which the time needed for dissolution of the non-water soluble plastics was 5 minutes. Approximately the same yields and purities of final product were obtained, again with particle sizes of polyester product chiefly in the range of 10 to 100 microns. The relative viscosity of the vacuum upgraded product average about 2.15.

EXAMPLES 13 THROUGH 17

The procedure defined as "B-Alternate Process" was used with the solvents of Table 2 and the conditions of Table 4 where the time required for initial solution was 5 minutes. Again, 400 grams of scrap film and 1000 grams of the mixed solvents were used as in Example 1.

After the digestion step for complete precipitation of silver values was completed and the silver values removed from the reaction mixture as in Example 1, the filtrate containing the polymeric portions of the scrap in solution was chilled rapidly with stirring into a temperature range of 0° C to −10° C.

600 cc's of methylisobutylketone also chilled into a temperature range of 0° C to −10° C were added with stirring and the reaction mixture was filtered to recover the precipitated polyester and washed with a 300 cc portion of cold methylisobutylketone.

The recovered polyester was vacuum dried for 30 minutes at 200° C, weighed 232 grams, exhibited a relative viscosity of 2.15 and an average particle size of less than 10 microns.

The filtrate was reduced in volume by distillation at 300mm of mercury at 100° C till about 900 cc's of distillate, chiefly methylisobutylketone, distilled over.

The pot liquor was allowed to stand at 25° C for 1 hour during which time a small amount of precipitate appeared which was filtered off and washed with 50 cc's of methylisobutylketone. After vacuum drying the recovered weight of precipitate was 5 grams, making a total recovered weight of polyester equal to 237 grams, slightly more than 99 percent of the theoretical yield.

Yields of calcined silver product were about the same in amount and purity as in Example 1.

The polyvinylidene terpolymer was recovered by partitioning as in Example 1 and was found to weigh 14.6 grams, a yield slightly higher than 100 percent indicating a slight residual contamination with other products, possibly polyester.

We claim:
1. A process for recovery of the silver content of photographic film scrap containing more than one non-water soluble polymeric material at least a portion of which is polyester, said film scrap comprising a non-water soluble polymeric base selected from the group consisting of polyesters and cellulose acetate; a non-water soluble polymeric subbing layer including a chlorine containing polymer and a gelatine layer containing metallic silver or silver halide;
   1. contacting the photographic film scrap with a first solvent for the non-water soluble polymeric material at a temperature above that at which said non-water soluble polymeric material dissolves;
   2. filtering the resulting hot solution for removal of silver and contaminants in the photographic film scrap which are insoluble in said first solvent;
   3. calcining the insoluble materials separated in Step 2 in order to recover the silver values therein;
   4. cooling the hot filtrate derived from Step 2, thereby precipitating the polyester contained therein and recovering the polyester in powdered form by filtration of the cooled filtrate;
   5. treating the cooled filtrate from Step 4 with a second solvent in which the polyester is insoluble, said first solvent is soluble and the other non-water soluble polymeric materials are also soluble, and removing any residual polyester which precipitates by filtration;
   6. partitioning the filtrate by addition of a third solvent in which the chlorine containing polymers originally present in said scrap are insoluble and in which the non-chlorine containing polymers originally present in said scrap are soluble and removing precipitated polymers by filtration;
   7. recovering said non-chlorine containing polymers by adding a fourth solvent in which said non-chlorine containing polymers are insoluble; and
   8. filtering the product of Step 7 and recovering the precipitated polymers.

2. The process of claim 1 in which the non-water soluble polymers present in said scrap comprise a polyethylene terephthalate base and a terpolymer subbing layer comprising a major amount of vinylidenechloride, a minor amount of methylmethacrylate, and a still lesser amount of itaconic acid.

3. The process of claim 1 in which the first solvent is selected from the group consisting of: aryl ethers, phenones, esters of dicarboxylic acids, pyrollidones, lactones, pyrolles, amides and mixtures thereof in which the solvents of said group do not contain halogens, amine side groups, or doubly bonded sulphur.

4. The process of claim 1 wherein said first solvent contacts the scrap for not more than 15 minutes in Step 1 of said process.

5. The process of claim 1 wherein said first solvent contacts the scrap for not more than 5 minutes in Step 1 of said process.

6. The process of claim 1 wherein the solution of the non-water soluble polymers is complete, the resulting mixture is digested at said temperature for at least an additional 10 minutes to complete precipitation and consolidation of the silver containing portions of the film scrap.

7. The process of claim 1 including heating the photographic film scrap to 150° C for at least 10 minutes and then adding the heated film scrap to said first solvent.

8. The process of claim 1 wherein the temperature at which the film scrap is contacted with said first solvent is below the boiling point of said solvent but at a temperature not less than 165° C.

9. The process of claim 1 wherein the polyester product is obtained in a particle size range of 10 to 100 microns by cooling the first filtrate in Step 4 of claim 1 to a precipitating temperature above room temperature, but not below a temperature range of 65° C to 150° C, maintaining the mixture at said precipitating temperature for a period of 20 to 40 minutes, cooling to a temperature of 20° to 25° C and separating out the precipitated polyester by filtration.

10. The process of claim 1 where the polyester product is obtained in a particle size range of less than 10 microns by rapid cooling of the first hot filtrate in Step 4 of said process, to a precipitating temperature in the range of 0° C to −10° C, separating out the precipitated polyester by filtration.

11. The process of claim 1 wherein the relative viscosity of the recovered polyester powder precipitate is not less than the relative viscosity of the polyester in the starting raw material.

12. The process of claim 1 where the second solvent is a higher alkyl ketone.

13. The process of claim 1 where the third solvent is selected from the group consisting of lower aliphatic alcohols and liquid straight chain hydrocarbons.

14. The process of claim 1 wherein the fourth solvent is water.

15. The process of claim 1 wherein the materials in the scrap photographic film insoluble in the first solvent include at least one member of the group consisting of silver, silver compounds, gelatin, cellulose fibers, antimony compounds, siliceous compounds and casual dirt.

16. The process of claim 1 wherein the silver content and the first solvent-soluble but water-insoluble polymers are recovered separately in yields in excess of 99% of the content of these materials in the original raw material.

17. The process of claim 1 where the solvents used are recovered by fractional distillation for recycle use in said process.

* * * * *